9241X
E. P. FITZPATRICK.
SMUT MILL.
Patented Nov. 14, 1835.
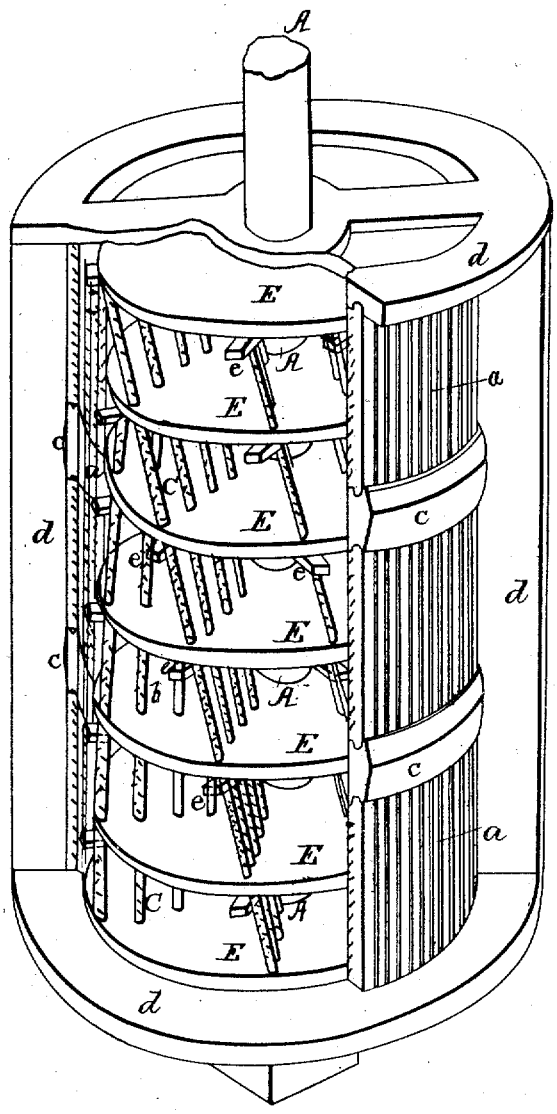
THE NORRIS PETERS CO., PHOTO-LITHO., WASHINGTON, D. C.

Edward P. FitzPatrick of Mount Morris N York

Patented Nov. 14. 1835 — Letters Patent.

The Schedule referred to in these Letters Patent and making part of the same containing a description in the words of the said Edward P. FitzPatrick himself of his improvement in the Smut machine for cleaning Grain.

To all to whom these presents shall come. Be it known that I Edward P. Fitzpatrick of Mount Morris in the County of Livingston and State of New York have invented a new and useful improvement in the Smut machine, and that the following is a full and exact description of the construction and mode of operation thereof as invented or improved by me. I would state that the difference of my principle consists in allowing a free passage for smut (or other matter to be disengaged from the grain) that it may be drawn through the surrounding case or cylinder which incloses the beaters and thereby disposed of as fast as separated. Also that I apply the beaters in a spiral form around the axis. and compose them of long rods or bars having sharp or ragged edges through or amongst which the grain is dashed and driven about as it descends these spirals the axis thereof being placed vertically and revolving rapidly. In constructing I dispense with the old covering cylinder made of a continued sheet without openings and in place of it substitute one made of rods or bars placed lengthwise in the circumference at such a distance asunder as to allow the offensive powder to be drawn out between them by the circulation produced by the revolution of the Beaters. these rods I secure at the proper distances by inserting them into cast iron circular bands or hoops formed with grooves in the edges or top and bottom as they would stand into which I place the ends of the rods at such a distance apart as may be thought to answer the end and then secure them by pouring in melted lead or other suitable metal which in hardening retains them. These bands may be repeated as often as requisite and are to stand one above the other in a vertical position, and then supported by a corresponding circular frame and uprights which is closed at the top and at the bottom around the axis except by leaving a sufficient aperture in the former for the grain to be introduced and in the latter for it to be discharged. This frame and bands will be best made in two semi-cylinders by dividing them longitudinally in which condition they are to be again united by means of bolts and screws. This is intended to give an opportunity to come at the interior in case of accident or any need of repairs. The shaft is to pass through the centre of this cylinder and is to be furnished with cross arms at stated intervals as many as may be requisite which are also to have attached to them a plate of metal filling up the plane of the diameter to within a few inches of the extremity of said arms - or sufficiently remote from thence to allow of a passage of the grain through the space thus left. This arrangement presents as it were a number of chambers through which the grain must pass in its descent. Now these arms are to be connected by spiral beaters formed of long square rods or bars running round from the top to the bottom of the shaft and through these arms at such intervals apart as to allow the grain to be driven through or between them which is effected by the rapid revolution of the beaters. for as the grain falls down the inclined planes thereof, it is dashed from one to the other through the bars toward the bottom of the chamber over which it again pours into the next & so on. The bars are made of square iron in order to produce sharp edges, and these are again roughened by cutting thereon ragged notches so as to give every opportunity for dislodging the smut and also the small fibrous projections at the small end of the grain which effects a material improvement in the process of cleaning it. The shaft is supported at its bottom on a step beneath the bottom of the outside cylinder, and is set in motion by the usual application of power.

What I claim as my own invention and not previously known in my above described improvement, and for which I ask Letters Patent is, first. the manner of construction of the outside cylinder according to the principles above laid down, in permitting the disengaged matter to escape during the operation of the beaters — Secondly, the manner of construction in the spiral beaters as they are described, to be made of square sharp and ragged edges, between which the grain is cleaned according to the principles I have already set forth, and generally such manner of construction and mode of operation as any competent machinist will perceive to be the distinguishing characteristics of my machine from those already used. Finally the spiral form of

9241X bater I claim for this purpose (as different from those heretofore used) for the reason shown. In testimony that the above is a full description of the construction and mode of operation of my Improvement as invented by me I have hereunto set my hand this twenty third day of October in the year eighteen hundred and thirty five.

Recd. W.J.

Witnesses. Edw. P. Fitzpatrick
C. H. W. Wharton
A. D. Childs 966 words.

[illegible]

Drawing Made 38